United States Patent [19]

Kato

[11] Patent Number: 5,635,992
[45] Date of Patent: Jun. 3, 1997

[54] COLOR TEMPERATURE SELECTOR AND METHOD OF SELECTING COLOR TEMPERATURE

[75] Inventor: Hiroshi Kato, Takatsuki, Japan

[73] Assignee: Matsushita Electric Industrial Co., Ltd., Osaka, Japan

[21] Appl. No.: 838,919

[22] Filed: Feb. 21, 1992

[30] Foreign Application Priority Data

Feb. 28, 1991 [JP] Japan .................................. 3-034088

[51] Int. Cl.$^6$ .................................................. H04N 9/73
[52] U.S. Cl. .......................... 348/655; 348/656; 348/734
[58] Field of Search ................................ 358/29 C, 29, 358/30, 26, 27, 31, 23, 194.1, 28, 21 R, 10; 340/825.89, 825.86; 307/239; 348/655, 656, 659, 643, 644, 645, 663; H04N 9/73

[56] References Cited

U.S. PATENT DOCUMENTS 4,486,771  12/1984  Machida .................. 358/29 C
4,860,092   8/1989  Hieda ..................... 358/29 C

FOREIGN PATENT DOCUMENTS 63242090  10/1988  Japan .
2219169   11/1989  United Kingdom .

*Primary Examiner*—Sherrie Hsia

[57] ABSTRACT

A color temperature selector for a television receiver which can select a color temperature using electrical control signals. The emitter of a drive transistor is fixedly connected to one resistor which is connected in parallel with two selective resistors to change the emitter resistance value. The two selective resistors are selectively connected to the fixed resistor using general semiconductor switches. This arrangement allows a remote controller to select a color temperature by a control signal, and allows to select a desired combination of color temperature setting states.

14 Claims, 6 Drawing Sheets

EMITTER RESISTORS FOR RED

EMITTER RESISTORS FOR BLUE

FIG. 2B

| SWITCH 32 | SWITCH 401 | SWITCH 402 | EMITTER REGISTER VALUE FOR RED | SWITCH 32 | SWITCH 403 | SWITCH 404 | EMITTER REGISTER VALUE FOR BLUE |
|---|---|---|---|---|---|---|---|
| <H> | OFF | OFF | H | <H> | OFF | ON | L |
| <M> | ON | OFF | M | <M> | ON | OFF | M |
| <L> | OFF | ON | L | <L> | OFF | OFF | H |

| DRIVE LEVEL FOR BLUE \ DRIVE LEVEL FOR RED | H | M | L |
|---|---|---|---|
| H | a | b | c |
| M | d | e | f |
| L | g | h | i |

FIG. 5

COLOR TEMPERATURE SELECTOR AND METHOD OF SELECTING COLOR TEMPERATURE

BACKGROUND OF THE INVENTION

The present invention relates to a color temperature selector for selecting a color temperature of a color image displayed on a CRT of a color television receiver.

Recently, the performance and function of a color television receiver have improved greatly. Color television receivers equipped with a color temperature selector have been desired wherein the color temperature of an image can be selected with a remote controller in accordance with user preference or the contents of displayed images.

Figure 6:
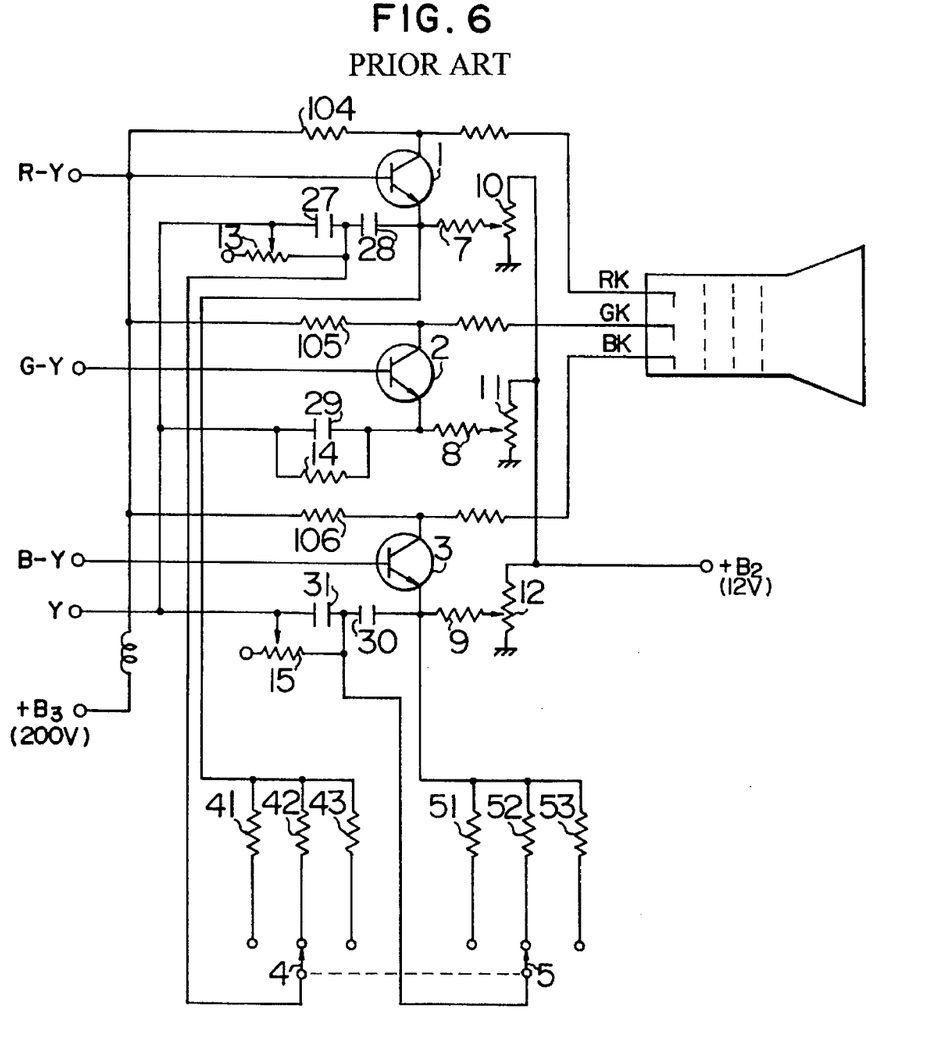
FIG. 6 is a circuit diagram of a conventional color temperature selector.

A conventional color temperature selector generally has a structure such as shown in FIG. 6. This structure will be described while referring to FIG. 6.

As shown in FIG. 6, the emitters of red and blue signal output transistors 1 and 3 each have three resistors connected in parallel with a capacitor. The three resistors have high, middle, and low resistance values, respectively, and are selected by switches.

The base of the red signal output transistor 1 is supplied with a red color difference signal. The emitter thereof is supplied with a luminance signal Y via a red signal drive adjusting variable resistor 13 and via one of resistors 41, 42 and 43 selected by a color temperature selector switch 4 (the resistance values are set such that resistor 41>resistor 42>resistor 43).

Similarly, the base of the blue signal output transistor 3 is supplied with a blue color difference signal. The emitter thereof is supplied with the luminance signal Y via a blue signal drive adjusting variable resistor 15 and via one of resistors 51, 52 and 53 selected by a color temperature selector switch 5 (the resistance values are set such that resistor 51<resistor 52<resistor 53).

The base of a green signal output transistor 2 is supplied with a green color difference signal, and the emitter thereof is supplied with the luminance signal Y via an emitter resistor 14.

The drive level for the green signal is fixedly set.

The color temperature selector switches 4 and 5 operate in unison. The values of the resistors 42 and 52 each having a middle value are set such that when the switches select them, the red and blue signals are driven at a middle level. The drive gain of the output circuit is expressed by the following equation:

Drive Gain=(load resistor value Rl)/(emitter resistor value Re)  (1)

The smaller the values of the resistors selected by the switches 4 and 5, the larger drive levels are obtained.

When the switches 4 and 5 select the resistor 41 with a high resistance value and the resistor 51 with a low resistance value, the drive level for the red signal becomes smaller than when the resistor 42 was selected, and the drive level for the blue signal becomes larger than when the resistor 52 was selected. Accordingly, a bluish image having a high color temperature is displayed on the screen.

When the switches 4 and 5 select the resistor 43 with a low resistance value and the resistor 53 with a high resistance value, the drive level for the red signal increases and that for the blue signal decreases. Accordingly, a reddish image having a low color temperature is displayed on the screen.

With a conventional color temperature selector as described above, one of the three emitter resistors are exchangeably selected to determine a drive level. In this case, the resistance of each drive transistor takes nearly the same value of the selected emitter resistor when the transistor turns on. The range of values of these three resistors is wide, so that semiconductor switches which are turned on and off by a control signal have been impossible to use.

If the on/off control by a control signal is performed using relay switches or the like, a corresponding number of relay switches are required, resulting in a complicated circuit and high cost which is not practical for use with home electronics such as television receivers.

In view of this, a conventional color temperature selector uses mechanical switches to select a color temperature.

In assembling a conventional color temperature selector using mechanical switches in a television receiver, there are some restrictions such as the mounting space of switches and the connection lead wire length. Furthermore, such a color temperature selector cannot be driven by an electrical control signal, posing a problem that it cannot use a remote controller.

SUMMARY OF THE INVENTION

The present invention solves the above problems, and aims at providing a color temperature selector which can be remotely controlled, by using semiconductor switches to be turned on and off by a control signal.

In order to achieve the above object, instead of exchangeably selecting one of three emitter resistors by a switch to determine a drive level, the emitter of a drive transistor is fixedly connected to one resistor which is connected in parallel with two selective resistors to change the emitter resistance value.

With the above-described structure, it is possible to use general semiconductor switches having a relatively high resistance value and select a color temperature by changing the emitter resistance value of a drive transistor upon reception of a control signal from a remote controller.

DESCRIPTION OF THE PREFERRED EMBODIMENTS

The embodiments of the present invention will be described with reference to the accompanying drawings.

Figure 1:
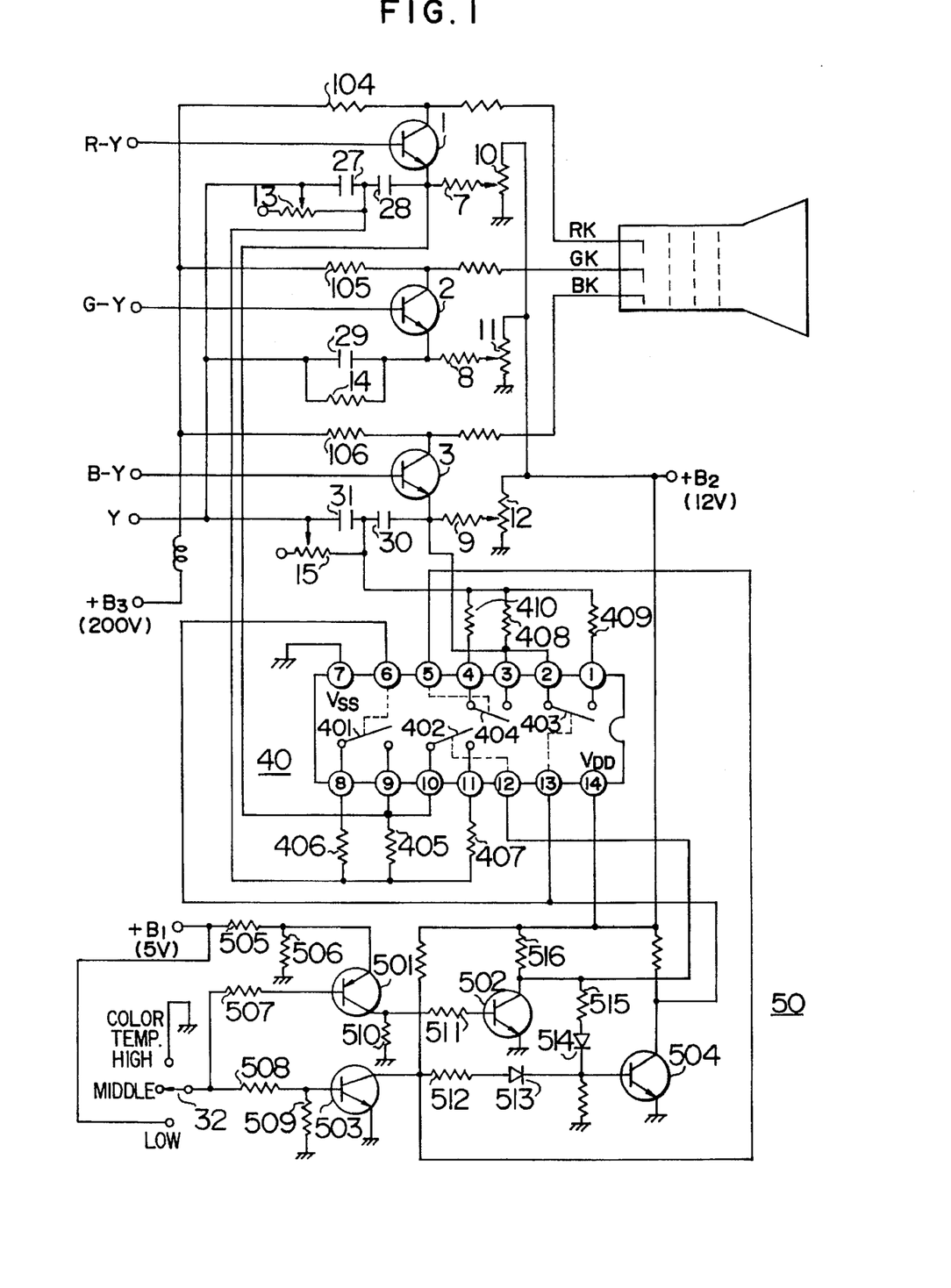
FIG. 1 is a circuit diagram of a color temperature selector according to an embodiment of the present invention.

FIG. 1 is a circuit diagram of the color temperature selector according to an embodiment of the present invention.

In FIG. 1, reference numerals 1, 2, and 3 represent red, green, and blue output drive transistors. The bases of the output drive transistors are supplied with red, green, and blue color difference signals, and the collectors thereof are connected to a power source +B3 (200 V) respectively via load resistors 104, 105, and 106.

The emitters of the output drive transistors are connected to the middle points of cutoff adjusting variable resistors 10, 11, and 12 respectively via buffer resistors 7, 8, and 9.

The emitter of the green output drive transistor 2 is supplied with a luminance signal Y via its emitter resistor 14.

The emitter of the red output drive transistor 1 is supplied with the luminance signal Y via a resistor 405 and via a drive adjusting variable resistor 13 which absorbs a difference of red light emission efficiency of the CRT.

The resistor 405 is arranged to be connected in parallel with resistors 406 and 407 by switches of a semiconductor switching circuit 40 (e.g., MN4066 manufactured by Matsushita Electronics Industries, Ltd.) Each switch in the semiconductor switching circuit can be opened or closed by a control signal. Therefore, for example, the value of the emitter resistor inserted between the emitter of the red output drive transistor 1 and the red drive adjusting variable resistor 13 can be changed in accordance with the state of parallel connection between the resistors 406, 407, and 405, the parallel connection state being changeable by controlling switches of the semiconductor switching circuit 40 using control signals.

The following three values of the emitter resistor for red color can be set.

The first value of the emitter resistor is a middle value for setting a middle drive level. This value is obtained when a switch 401 is closed to connect the resistors 405 and 406 in parallel.

The second value of the emitter resistor is a lower value than the middle value for setting a drive level higher than the middle drive level. This value is obtained when the switch 401 is opened and a switch 402 is closed to connect the resistors 405 and 407 in parallel.

The third value of the emitter resistor is a higher value than the middle value for setting a drive level lower than the middle drive level. This value is obtained when the switches 401 and 402 are both opened to connect only the resistor 405.

The values of the resistors 405, 406, and 407 are determined so as to obtain the above-described, high, middle, and low values.

Similarly, the following three values of the emitter resistor for blue color can be set.

The middle value for the middle drive level is obtained by parallel connection to resistors 408 and 409 when a switch 403 is closed.

The low value for a higher drive level than the middle drive level is obtained by parallel connection of the resistors 408 and 410 when the switch 403 is opened and a switch 404 is closed.

The high value for a lower drive level than the middle drive level is obtained by only the resistor 408 when the switches 403 and 404 are both opened.

The color temperature selector is provided with a controller for controlling switches of the semiconductor switching circuit and selecting one of the three setting states. The controller has a color temperature switch 32 for selecting one of the three setting states, three NPN transistors 502, 503, and 504, a PNP transistor 501, diodes 513 and 514, and resistors.

The color temperature switch 32 selects one of the three input levels for the base of the NPN transistor 503, including an L level (0 V), an OPEN level (a certain voltage), and an H level (+B1 V).

The switch 32 has three contacts including (High), (Middle), and (Low), respectively corresponding to the (L), (OPEN), and (H).

The common terminal of the switch 32 is connected to a resistor 508. The selected input level is divided by the resistors 508 and 509 and supplied to the base of the transistor 503.

The structure of the controller shown in FIG. 1 will be described further in the following.

The emitter of the NPN transistor 503 is grounded, and the collector is connected to a control terminal (5) of the semiconductor switching circuit to control the open/close state of the switch 404. The collector of the transistor 503 is connected to the base of the NPN transistor 504 via a resistor 512 and the diode 513. The common terminal of the color temperature switch 32 is connected via a resistor 507 also to the base of the PNP transistor 501. The emitter of the transistor 501 is supplied with a voltage of the +B1 (5 V) divided by resistors 505 and 506. The collector thereof is grounded via a resistor 510.

An output from the collector of the transistor 501 is supplied to the base of the NPN transistor 502 via a resistor 511.

The collector of the transistor 502 outputs a signal which is obtained by inverting the output from the collector of the transistor 501.

The collector of the transistor 502 is connected to a control terminal (12) of the semiconductor switching circuit 40, and via a resistor 515 and diode 514 to the base of the transistor 504.

An output from the collector of the transistor 502 controls the open/close state of the switch 402 of the semiconductor switching circuit 40.

The collector of the transistor 504 is connected to control terminals (6) and (13) of the semiconductor switching circuit 40 to control both the switches 401 and 403 of the semiconductor switching circuit 40.

With the color temperature selector constructed as above, when the color temperature switch 32 is set to the (Middle) state, the base current of the transistor 501 flows through the resistors 507, 508, and 509, with the transistor 501 being made conductive. As a result, an (H) signal is outputted from the collector of the transistor 501. This (H) signal is inverted by the transistor 502 to output an (L) signal. This (L) signal is supplied to the control terminal (12) of the semiconductor switching circuit 40 to open the switch 402.

In this state, the base current of the transistor 501 causes the transistor 503 to output from its collector an (L) signal. Therefore, the switch 404 is opened.

Also in this state, since the base input of the transistor 504 is 0 V, it becomes non-conductive and outputs an (H) signal from the collector. Therefore, both the switches 401 and 403 are closed.

In this state, the value of the emitter resistor for the red color is set to a sum of the value of the parallel resistors 405 and 406 and the value of the variable resistor 13.

The value of the emitter resistor for the blue color is set to a sum of the value of the parallel resistors 408 and 409 and the value of the variable resistor 15.

As a result, the emitter resistors for both the red and blue colors are set to the middle value, and the drive levels are set so as to obtain the standard (middle) color temperature.

When the color temperature switch 32 is set to the (High) state, the transistor 503 turns off and outputs an (H) signal from its collector. Therefore, the switch 404 of the semiconductor switching circuit 40 is closed.

When the transistor 503 turns off, the transistor 504 turns on and outputs an (L) signal from its collector. Therefore, both the switches 401 and 403 are opened.

In this state, since the transistor 501 is conductive, it outputs an (H) signal from the collector and the next stage transistor 502 outputs an (L) signal from the collector. Therefore, the switch 402 is opened.

In this state, the emitter resistor for the red color is set to the high value, with only the variable resistor 13 and resistor 405 being connected, providing a low drive level for the red color. The emitter resistor for the blue color is set to the low value, with the variable resistor 15 and the parallel resistors 408 and 410 being connected, providing a high drive level for the blue color. As a result, a bluish image with a high color temperature is displayed on the screen.

When the color temperature switch is set to the (Low) state, the transistors 501 and 502 are cut off. The transistor 502 outputs an (H) signal from the collector to close the switch 402.

The transistor 504 is made conductive and outputs an (L) signal from the collector. Therefore, both the switches 401 and 403 are opened.

The voltage +B1 divided by the resistors 508 and 509 is supplied to the base of the transistor 503 to turn it on and output an (L) signal from the collector. Therefore, the switch 404 is opened.

In this state, the emitter resistor for the red color takes the low value, with the variable resistor 13 and the parallel resistors 405 and 407 being connected, providing a high drive level for the red color.

The emitter resistor for the blue color takes the high value, with only the variable resistor 15 and resistor 408 being connected, providing a low drive level for the blue color. As a result, a reddish image with a low color temperature is displayed on the screen.

Figure 2A:
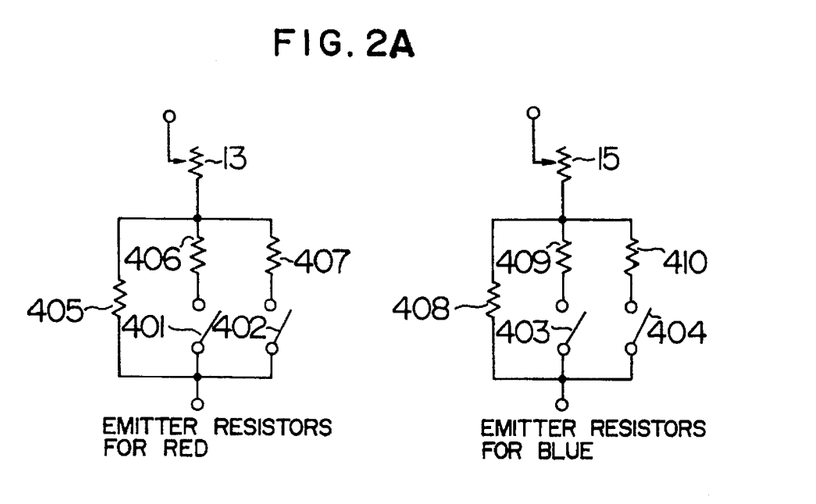
FIGS. 2A and 2B illustrate color temperature selecting states of the color temperature selector of the embodiment.
Figure 2B:
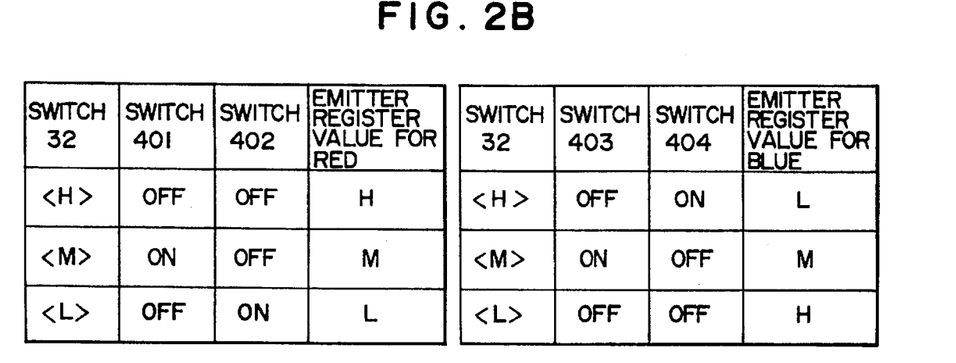

FIGS. 2A shows equivalent circuits for the color temperature setting states, and FIG. 2B shows matrix tables illustrating the color temperature setting states.

Figure 3:
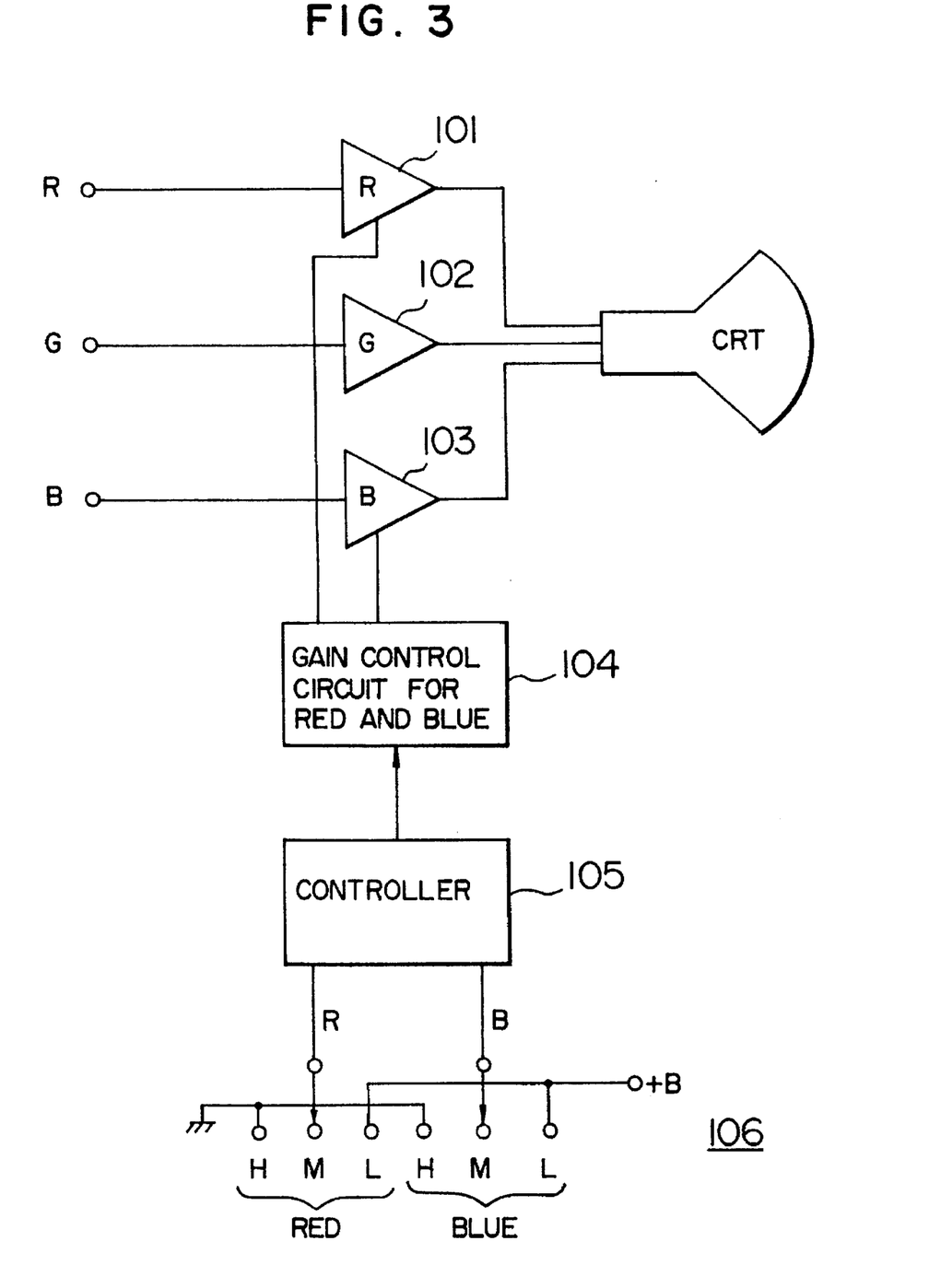
FIG. 3 is a block diagram showing the color temperature selector according to another embodiment of the present invention.

FIG. 3 is a block diagram showing the color temperature selector according to another embodiment of the present invention. In FIG. 3, reference numerals 101, 102, and 103 represent red, green, and blue output drive circuits. The circuits 101 and 103 are each structured as a variable gain amplifier.

Reference numeral 104 represents a gain controller for controlling the gains of the red and blue output drive circuits. Reference numeral 105 represents a controller for controlling the gain control circuit 104.

Reference numeral 106 represents an equivalent circuit of a selection control signal input unit for inputting a selection control signal to the controller 105.

Figure 4A:
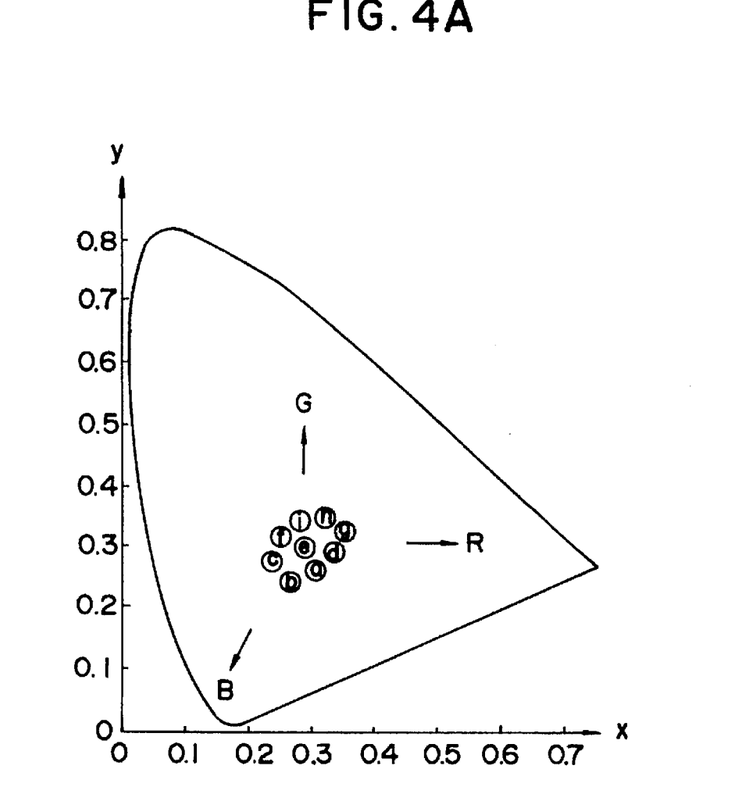
FIGS. 4A and 4B show color temperature setting points on a chromaticity diagram and a matrix table showing selection states.
Figure 4B:
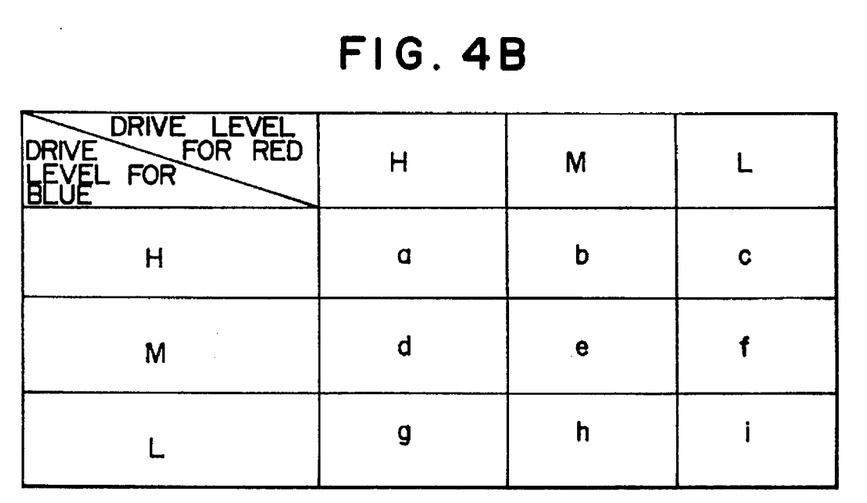

In this embodiment, three drive levels for selecting a color temperature are provided respectively for the red and blue colors. Therefore, the number of color temperature setting states is 3×3=9 as illustrated in FIGS. 4A and 4B. A desired combination of three setting states can be selected by selection control signals.

Figure 5:
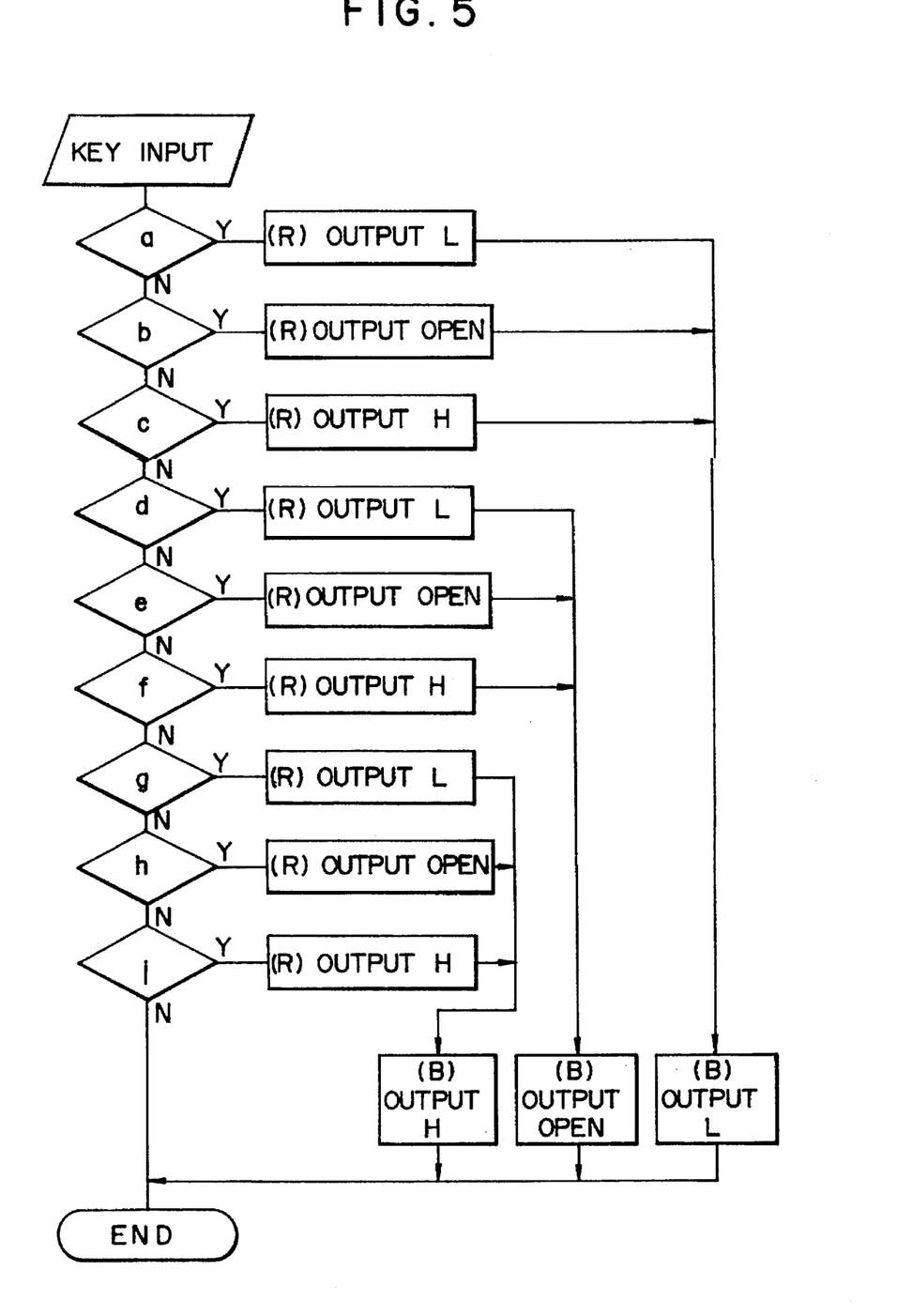
FIG. 5 is a flow chart showing a color temperature selection process.

FIG. 5 is a flow chart useful for explaining that a setting signal of R and B is logically produced relative to nine combinations of color temperature setting of FIG. 4B.

For example, in case a condition corresponding to a is set, a is inputted as a key input, a selection level of R of FIG. 3 is set to L, and a selection level of B is set to L. The set selection level of R and B is inputted to a switching input portion of FIG. 3 as a color temperature setting signal. Similarly, as shown in the flow chart of FIG. 5, a color temperature setting level is electrically produced in a simplified logical manner. Further, a combination of the color temperature setting is logically set easily as desired.

Accordingly, an output of a logic circuit as shown in the flow chart of FIG. 5 is connected to an input terminal R and B of switching control unit 105 of a color temperature setting device shown in FIG. 3 so that a similar control can be performed.

Thus, a color temperature switching control signal according to this invention is outputted in accordance with a manual operation unit of a television receiver and remotely controlled by controlling the logical circuit as shown in the flow chart of FIG. 5 through a remote control transmitting device.

Such a remote controller may be mounted with nine operation buttons corresponding to the nine selection control signals if there is a sufficient mount space, or may be mounted with three operation buttons each being preset with a desired combination of three setting states. In this manner, color temperature selection for a desired combination of three setting states can be carried out by sending selection control signals from the remote controller.

As appreciated from the above-described embodiments of the present invention, the drive levels of CRT drive circuits for the red, green, and blue colors can be electronically selected with a remote controller, by changing the emitter resistance values of the circuits by using semiconductor switches. Furthermore, a number of combinations of desired color temperature setting states can be provided.

I claim:

1. A color temperature selector comprising:
CRT drive circuits for red, green, and blue color signals;
first switching means for switching M drive levels of said red color signal by changing a combination of parallel connected resistors;
second switching means for switching N drive levels of said blue color signal by changing a combination of parallel connected resistors; and
selection controlling means for selecting at a time one of at least three combinations including an upper limit value, middle value, and lower limit value respectively set by said first and second switching means.

2. A color temperature selector comprising:
CRT driving circuits for red, green, and blue color signals;
first switching means for switching M drive levels of said red color signal by changing a combination of parallel connected resistors;
second switching means for switching N drive levels of said blue color signal by changing a combination of parallel connected resistors; and
selection controlling means for setting k combinations from M×N drive level combinations set by said first and second switching means, and selecting at a time one of said k drive level combinations.

3. A color temperature selector comprising:
drive amplifiers for red, green, and blue color signals;
gain switching means for switching the gains of two of said drive amplifiers for red, green and blue color signals by changing a combination of parallel connected resistors; and
selection controlling means for controlling said gain switching means by a selection control signal, wherein a combination of gain levels of any two of said drive amplifiers for red, green and blue color signals are selected by said selection control signal.

4. A color temperature selector according to claim 3, wherein said selection control signal is generated by a remote controller.

5. A color temperature selector according to claim 3, further comprising operation means for setting a gain of each of said drive amplifiers for red, green, and blue color signals.

6. A color temperature selector according to claim 3, wherein the gains of said two drive amplifiers switched by said gain switching means are the gains of said drive amplifiers for the red and blue signals.

7. A color temperature selector comprising:

CRT drive circuits for red, green, and blue color signals, each of said CRT drive circuits comprising an NPN drive transistor having a base inputted with a color difference signal, an emitter inputted with a luminance signal, and a collector inputted with a biasing voltage;

a first serial circuit of switch means and a resistance provided by parallel connected resistors, connected to the emitter of said drive transistor for the red color signal;

a second serial circuit of switch means and a resistance provided by parallel connected resistors, connected to the emitter of said drive transistor for the blue color signal; and switching control means for switching said switch means of each of said first and second serial circuits, wherein said switching control means switches said switch means of each of said first and second serial circuits to change the resistance values of said resistors of each of said first and second serial circuits by changing a combination of said parallel connected resistors, and change a color temperature.

8. A color temperature selector according to claim 7, wherein said switch means of each of said first and second serial circuits is adapted to change each of said resistance values of said resistors of each of said first and second serial circuits to one of a high, middle, and low resistance value, and said switching control means controls each of said switch means so as to take one of three combinations of said resistance values including (a) high first resistance value, low second resistance value, (b) middle first resistance value, middle second resistance value, and (c) low first resistance value, high second resistance value.

9. A color temperature selector comprising:

three first resistors each having one common end connected to the emitter of a drive transistor for a red color signal and another end connected to a contact of a first switch means;

three second resistors each having one common end connected to the emitter of a drive transistor for a blue color signal and another end connected to a contact of a second switch means; and control means for controlling the connections of said first and second switch means, wherein said one common end of each of said three first resistors is connected to a capacitor connected to the emitter of said drive transistor for the red color signal on the input side of a luminance signal;

said one common end of each of said three second resistors is connected to a capacitor connected to the emitter of said drive transistor for the blue color signal on the input side of the luminance signal; and said control means controls the connections of said first and second switch means to change the resistance values of said first and second resistors to change a combination of parallel connection thereof and change a color temperature.

10. A remote controller for remotely controlling a color television receiver having a color temperature selector according to claim 2, said remote controller comprising M×N operation buttons disposed in matrix, said buttons being operated to generate signals for said selection controlling means to select one of M×N drive level combinations of said first and second switching means.

11. A color temperature selecting method wherein M drive levels for a red color signal are switched, N drive levels for a blue color signal are switched, M×N drive level combinations are set to k levels corresponding to k points on an RGB chromaticity diagram, and one of k levels is selected to set a corresponding color temperature.

12. A color temperature selector comprising:

a semiconductor switching circuit having at least four switches each having two terminals and a control signal input terminal for receiving a control signal for controlling an open/close state between said two terminals;

two first resistors each having (i) one end connected to one end of an emitter resistor of a drive transistor for a red color signal of a CRT drive circuit and (ii) another end connected to a different one of the four terminals of two switches of said at least four switches, the remaining two of the four terminals being connected to the emitter of said drive transistor for the red color signal;

two second resistors each having (i) one end connected to one end of an emitter resistor of a drive transistor for a blue color signal of a CRT drive circuit and (ii) another end connected to a different one of the four terminals of the two switches of said at least four switches, the remaining two of the four terminals being connected to the emitter of said drive transistor for the blue color signal; and a controller connected to the control signal input terminal of said at least four switches for supplying said control signal and controlling said least four switches.

13. A color temperature selector according to claim 12, wherein said controller for supplying said control signal to said semiconductor switching circuit is mounted within a remote controller.

14. A color temperature selector according to claim 13, wherein said control signal input terminal of one of two switches among said at least four switches connected to said drive transistor for the red color signal undergoes the open/close state control simultaneously with said control signal input terminal of one of two switches among said at least four switches connected to said drive transistor for the blue color signal, and said control signal input terminal of the other of the two switches connected to said drive transistor for the red color signal undergoes the open/close state control simultaneously with said control signal input terminal of the other of the two switches connected to said drive transistor for the blue color signal.

* * * * *